(12) United States Patent
Chiba (10) Patent No.: US 12,133,014 B2
(45) Date of Patent: Oct. 29, 2024

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Shinichi Chiba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 18/049,564

(22) Filed: Oct. 25, 2022

(65) Prior Publication Data

US 2023/0125102 A1    Apr. 27, 2023

(30) Foreign Application Priority Data

Oct. 27, 2021 (JP) .................................. 2021-175498

(51) Int. Cl.
*H04N 5/262* (2006.01)

(52) U.S. Cl.
CPC .................................. *H04N 5/2628* (2013.01)

(58) Field of Classification Search
CPC ... H04N 2201/0075; H04N 2201/0094; H04N 2201/0093; H04N 1/32518; H04N 1/0097; H04N 1/00204; H04N 1/00954; H04N 5/2628; G06F 3/1291; G06F 3/1257; G06F 3/1224; G06F 3/1205; G06F 3/1204; G06F 3/123; G06F 3/1285; H04M 1/00; H04I 9/32
USPC .................................. 455/418; 713/168, 171
See application file for complete search history.

(56) References Cited

U.S. PATENT DOCUMENTS

2014/0208115 A1* 7/2014 Fukada ................. H04L 9/0891
713/168

FOREIGN PATENT DOCUMENTS

JP    2015014515 A    1/2015

* cited by examiner

*Primary Examiner* — Xi Wang
(74) *Attorney, Agent, or Firm* — Canon U.S.A., Inc. IP Division (57) ABSTRACT

An information processing apparatus includes a detection unit configured to detect that a setting value related to a time has been deleted, and a setting unit configured, in a case where deletion of a setting value related to a time has been detected by the detection unit, to newly generate an option corresponding to the deleted setting value and to set the option as a new setting value related to the time.

6 Claims, 10 Drawing Sheets

TABLE BEFORE CORRECTION 1000

| INTERNAL VALUE | OPTIONS BEFORE UPGRADE | OPTIONS AFTER UPGRADE |
|---|---|---|
| 1 | (UTC+00:00) SAO TOME | (UTC+00:00) SAO TOME |
| 2 | (UTC+00:00) DUBLIN | (UTC+00:00) DUBLIN |
| 3 | (UTC+00:00) EDINBURGH | (UTC+00:00) EDINBURGH |
| ... | | |
| 13 | (UTC−05:00) PANAMA | NONE —1001 |
| ... | | |

FIG. 10B

TABLE AFTER CORRECTION 1010

| INTERNAL VALUE | OPTIONS BEFORE UPGRADE | OPTIONS AFTER UPGRADE |
|---|---|---|
| 1 | (UTC+00:00) SAO TOME | (UTC+00:00) SAO TOME |
| 2 | (UTC+00:00) DUBLIN | (UTC+00:00) DUBLIN |
| 3 | (UTC+00:00) EDINBURGH | (UTC+00:00) EDINBURGH |
| ... | | |
| 13 | (UTC−05:00) PANAMA | (UTC−05:00) —1011 |
| ... | | |

INFORMATION PROCESSING APPARATUS, CONTROL METHOD FOR INFORMATION PROCESSING APPARATUS, AND STORAGE MEDIUM

BACKGROUND

Field of the Disclosure

The present disclosure relates to an information processing apparatus, a control method for the information processing apparatus, and a storage medium.

Description of the Related Art

Multifunctional peripherals or printers of recent years have various functions, and there is a variety of setting contents for a device. For example, the printer can be automatically activated at a certain time by setting a time in a printer, and time at which printing is executed can be managed.

Among devices having time setting functions, some are designed to have a time zone setting function of correcting a difference from Coordinated Universal Time (UTC) based on latitude. In the time zone setting function, in general, a regional name is indicated along with a time difference. A user selects a region or a nearest region in which a device is placed, so that a time zone can be set.

There is a technique for automatically executing setting so that labor of a user when such a time zone is set is saved. Japanese Patent Application Laid-Open No. 2015-14515 discusses a technique by which position information and time information are acquired from web servers in the same network, and an appropriate time zone is set.

A regional name for which a time zone is to be set may be changed based on a worldwide standard. Accordingly, a device needs to follow such a trend. While software of an existing device is upgraded to follow the trend, the upgrade of the software may delete a setting value of the time zone that has been set. In such a case, a user may become confused by being suddenly left with an unset time zone. In addition, since a method discussed in Japanese Patent Application Laid-Open No. 2015-14545 cannot reset a time zone in a case where the device is not connected to a network, the user needs to reset the time zone. Such resetting also may cause confusion to the user.

SUMMARY

The present disclosure is directed to resetting of a time such that a user is not confused in a case where a time setting is deleted.

According to an aspect of the present disclosure, an information processing apparatus includes a detection unit configured to detect that a setting value related to a time has been deleted, and a setting unit configured, in a case where deletion of a setting value related to a time has been detected by the detection unit, to newly generate an option corresponding to the deleted setting value and to set the option as a new setting value related to the time.

Further features of the present disclosure will become apparent from the following description of exemplary embodiments with reference to the attached drawings.

DESCRIPTION OF THE EMBODIMENTS

Hereinafter, exemplary embodiments will be described with reference to the drawings. It is to be understood that the following exemplary embodiments are not intended to limit the scope of claims, and that not all of combinations of aspects described in the following embodiments are necessarily required with respect to an issue to be solved by the disclosure.

Figure 1:
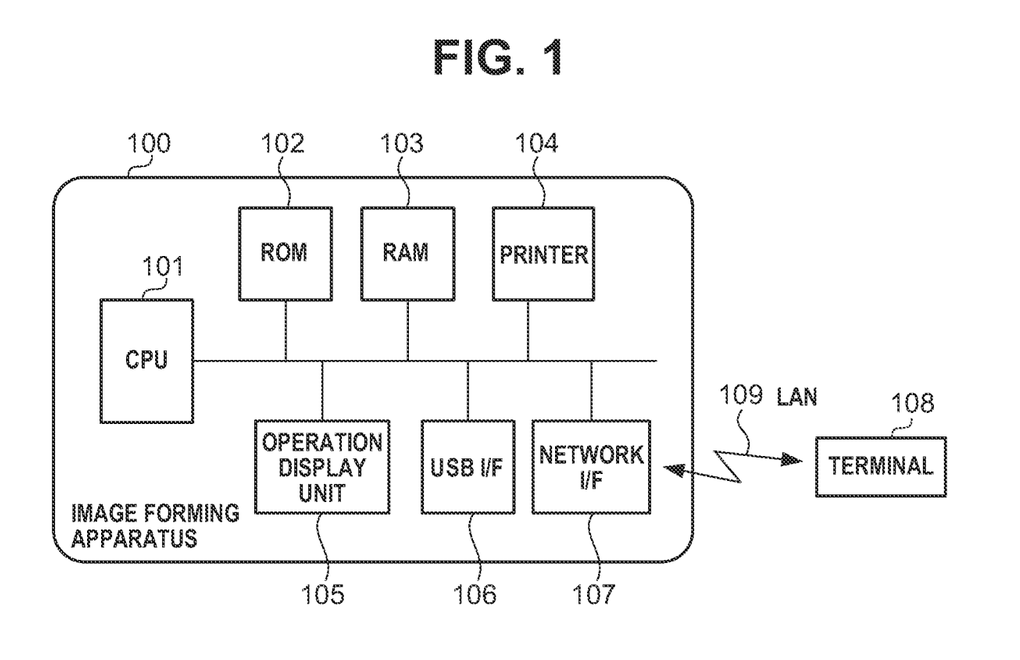
FIG. 1 is a block diagram illustrating a hardware configuration example of an image forming apparatus according to one or more aspects of the present disclosure.

FIG. 1 is a block diagram illustrating a hardware configuration example of an image forming apparatus 100 according to a first exemplary embodiment.

In FIG. 1, the image forming apparatus 100 is an example of an information processing apparatus, and includes a central processing unit (CPU) 1, a read only memory (ROM) 102, a random-access memory (RAM) 103, a printer 104, and an operation display unit 105. The image forming apparatus 100 also includes a universal serial bus (USB) interface (I/F) 106 and a network I/F 107. Each of the USB I/F 106 and the network I/F 107 serves as an interface for communicating with an external unit.

The CPU 101 is a system controller that comprehensively controls the image forming apparatus 100.

The ROM 102 stores a control program for the CPU 101. The control program is used to execute processing of a flowchart described below. A type of the ROM 102 includes a rewritable flash ROM, and the ROM 102 stores setting values and management data that are registered by a user of the image forming apparatus 100. In the present exemplary embodiment, settings related to time zones are stored in the ROM 102. The control program can be updated based on an input from an external unit. In the present exemplary embodiment, update processing is also called an upgrade of software. If software is upgraded, a content of control performed by the CPU 101 after the upgrade is different from that of before.

The RAM 103 stores an execution program, a program control variable, and buffers for various works. The RAM 103 also partially stores the setting values and management data which are registered by the user of the image forming apparatus 100.

The printer 104 records a received image and file data on a recording sheet.

The operation display unit 105 includes a numeric keypad, a keyboard, a touch panel, a liquid crystal display (LCD), and a light emitting diode (LED). The operation display unit 105 receives various operations performed by the user, displays an operation panel, and provides notification to the user.

Figure 2:
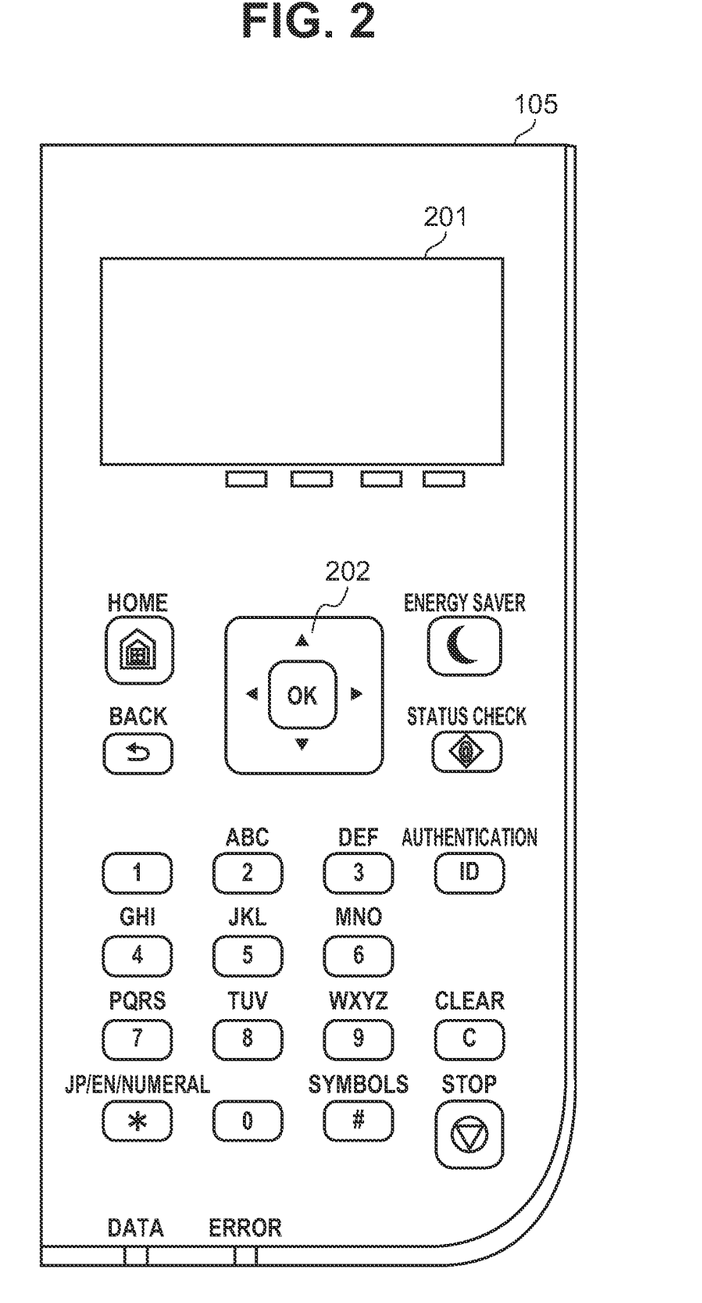
FIG. 2 is a diagram illustrating an example of outer appearance of an operation display unit.

Herein, FIG. 2 is a diagram illustrating an example of outer appearance of the operation display unit 105.

The operation display unit 105 includes a display unit 201 and a direction key 202.

The display unit 201 displays, for example, a state of a device, and a result of each input and output. The direction key 202 is an operation key for operation of the image forming apparatus 100. Functions including a function of vertically moving a selection cursor on a selection screen and a function of transitioning a display screen to a previous screen or a next screen are mainly allocated to the direction key 202. In the present exemplary embodiment, a time can be set by operation of the direction key 202.

The USB I/F 106 is connected to a USB device to communicate with the USB device and to supply electric power to the USB device.

The network I/F 107 transmits and receives data to and from each unit of the image forming apparatus 100 via a local area network (LAN) 109. Particularly, the network I/F 107 receives a print job from a terminal 108, and receives control information about the image forming apparatus 100 in a remote user interface (UI) function. The LAN 109 includes a wired LAN via which wired communication is performed, and a wireless LAN via which wireless communication is performed. As for an upgrade of software in the present exemplary embodiment, for example, the CPU 101 downloads new software from the Internet via the network I/F 107.

Figure 4:
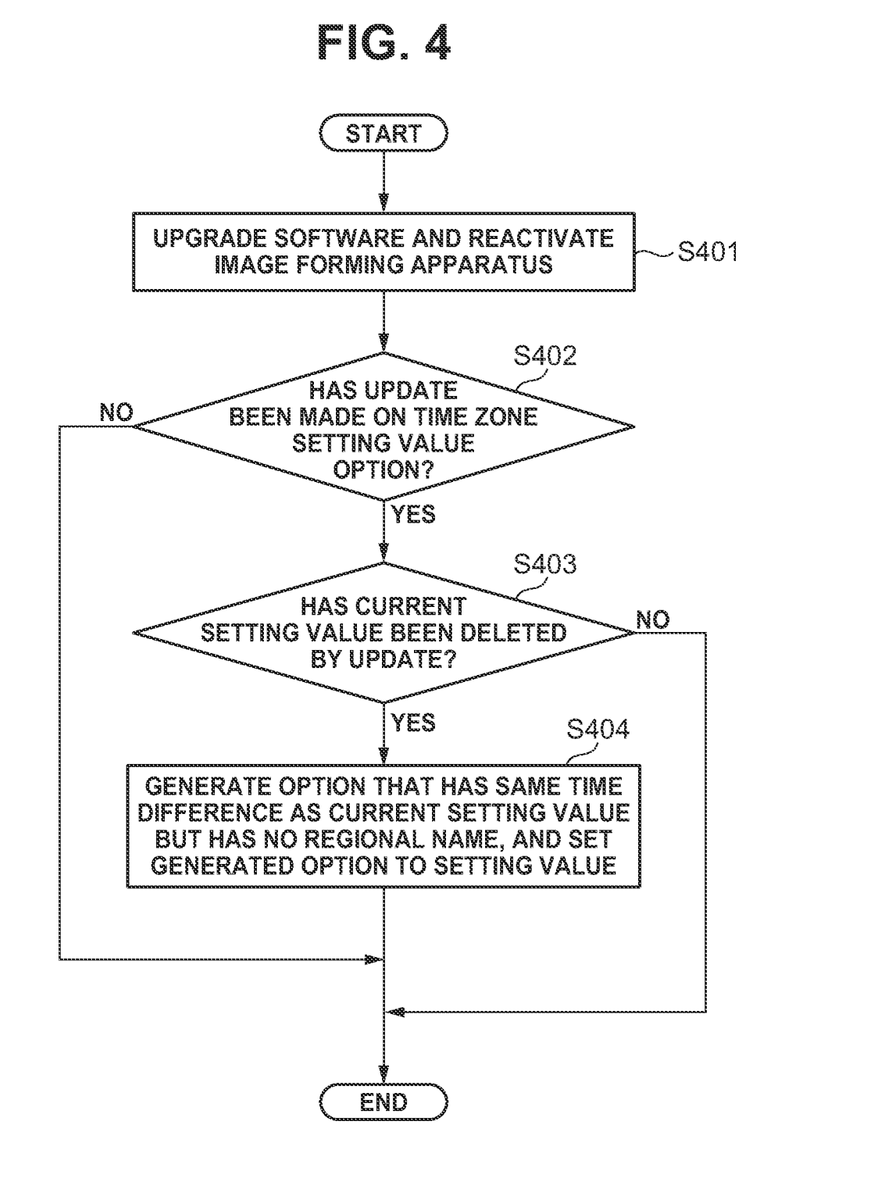
FIG. 4 is a flowchart illustrating an example of correction processing for a time zone setting according to one or more aspects of the present disclosure.

The processing of the flowchart illustrated in FIG. 4 described below can be performed in a state where the image forming apparatus 100 is not connected to another device such as the terminal 108 via a network.

Figure 3:
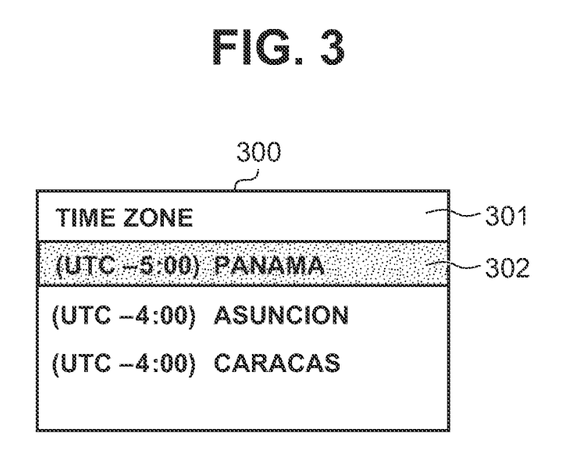
FIG. 3 is a diagram illustrating an example of a time zone setting screen.

Next, an example of a time zone setting screen according to the first exemplary embodiment will be described with reference to FIG. 3. A setting screen 300 illustrated in FIG. 3 is displayed on the operation display unit 105.

The setting screen 300 has a title area 301 in which a title indicating a setting screen for which setting value is displayed. In FIG. 3, a time zone setting screen is displayed. In an option group 302, time zone setting value options are displayed, and a selected item is highlighted so it may be recognized as a selected item.

Next, correction processing for a time zone setting according to the first exemplary embodiment will be described using the flowchart illustrated in FIG. 4. The processing of the flowchart begins when the CPU 101 receives a software upgrade instruction.

In step S401, the CPU 101 upgrades software, and reactivates the image forming apparatus 100.

In step S402, the CPU 101 compares a time zone setting value option before the upgrade and a time zone setting value option after the upgrade to detect whether the option has been updated.

Figure 10A:
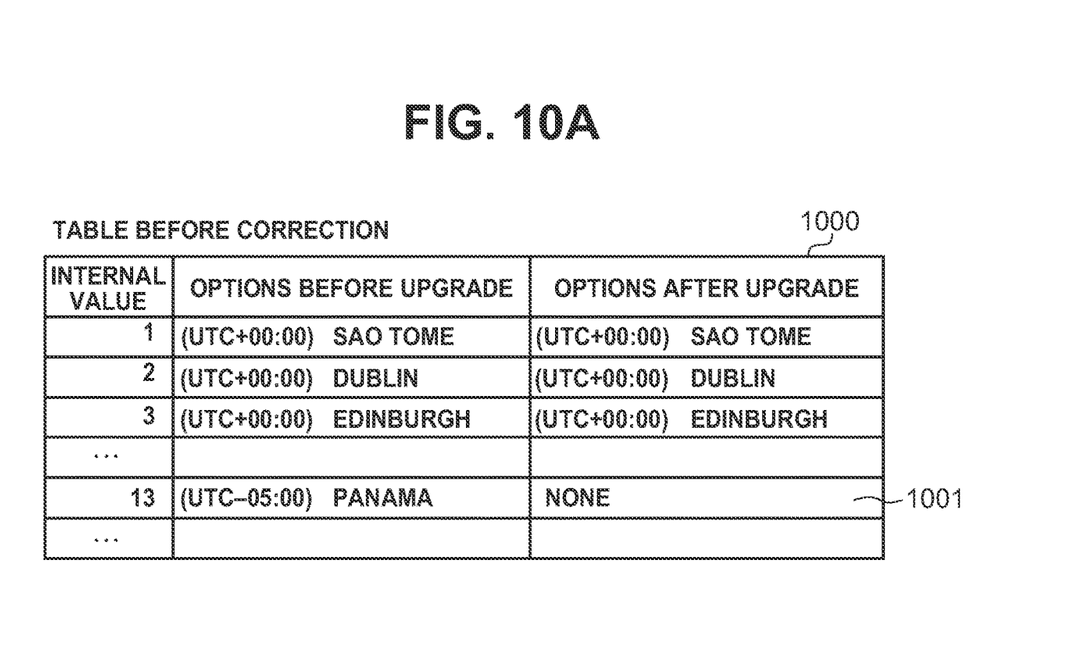
FIGS. 10A and 10B are diagrams illustrating the correction processing for the time zone setting according to one or more aspects of the present disclosure.

An example of processing by which an update of a time zone setting value option is detected in step S402 will now be described with reference to FIG. 10A.

A management table 1000 is a management table of time zone setting values immediately after software is upgraded, and is stored in the ROM 102.

Based on predetermined internal values, the CPU 101 arranges time zone setting value options before the upgrade and time zone setting values options after the upgrade in a management table to compare the options before the update with the options after the update. From a result of the comparison, it can be seen that an option of "(UTC-05:00) PANAMA" before the upgrade is deleted after the upgrade in an item 1001 illustrated in FIG. 10A. In this case, the CPU 101 determines that an update has been made on the option since the number of options before the upgrade and the number of options after the upgrade do not match.

The update determination method is not limited to the aforementioned method as long as any update that has been made on a time zone setting option can be determined. For example, even when the numbers of options before upgrade and the number of options after the upgrade are the same, a content of a time zone setting value option may be changed. In consideration of such a case, the CPU 101 can compare a content of an option before the upgrade with a content of an option after the upgrade. If the option before the upgrade and the option after the upgrade have different contents, the CPU 101 can determine that an update has been made on the option.

If the CPU 101 determines that an update has been made on the option (YES in step S402), the operation proceeds to step S403. On the other hand, if the CPU 101 determines that no update has been made on the option (NO in step S402), the operation of the flowchart ends.

In step S403, the CPU 101 determines whether the current setting value (the setting value before the upgrade) has been deleted by the update. Herein, if the current setting value is "(UTC-05:00) PANAMA" as illustrated in FIG. 3, the CPU 101 determines that the current setting value has been deleted since an option after the upgrade in the item 1001 in the example illustrated in FIG. 10A is deleted.

If the CPU 101 determines that that the current setting value has been deleted by the update (YES in step S403), the operation proceeds to step S404. If the CPU 101 determines that that the current setting value has not been deleted by the update (NO in step S403), the operation of the flowchart ends.

In step S404, the CPU 101 newly generates an option that has the same time difference as the current setting value but has no regional name, and newly sets the generated option as a setting value to be selected. The option corresponding to the current setting value is newly set as the setting value to be selected, so that a time-related operation performed by the image forming apparatus 100 after the upgrade of the software is substantially the same as that before the update of the software.

Figure 10B:
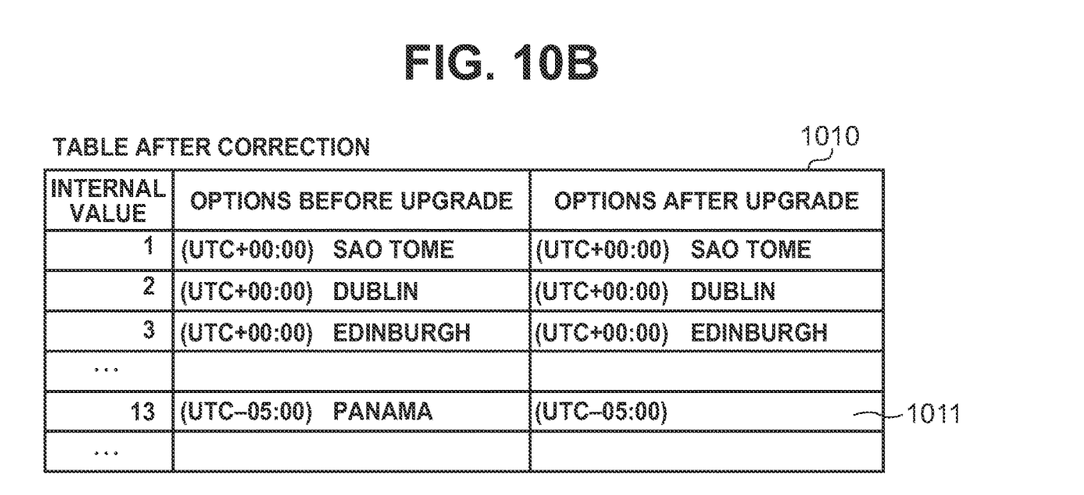

Correction processing performed when a time zone is set in step S404 will now be described with reference to FIG. 10B. A management table 1010 is provided after correction for a time zone setting is performed with respect to the management table 1000 illustrated in FIG. 10A. The management table 1010 is stored in the ROM 102.

The CPU 101 generates an item 1011 of "(UTC-05:00)" that has the same time difference as the current setting value but has no regional name. If such an internal value 13 is set in the device before the upgrade, the item 1011 of the same internal value 13 is set even after the upgrade.

Figure 5:
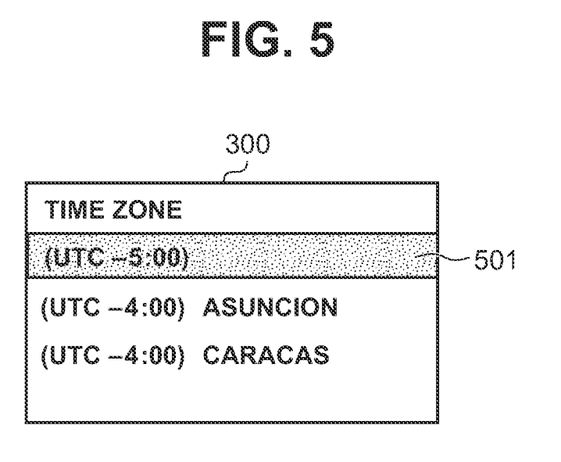
FIG. 5 is a diagram illustrating an example of a setting screen after the time zone setting is corrected according to one or more aspects of the present disclosure.

FIG. 5 is a diagram illustrating an example of a time zone setting screen when the time zone setting is corrected in step S404.

In a case where a time zone setting value that is currently set is deleted by upgrade, the CPU 101 generates an option 501 that has the same time difference as the current setting value but has no regional name, and newly sets the option 501 to a time zone.

The operation of step S404 has been described using a case in which an option having no regional name is generated. However, a regional name that is the same as a regional name of the current setting value may be provided. That is, an option having the same time difference and the same regional name as the current setting value can be generated, and the generated option can be set as a new setting value.

According to the present exemplary embodiment, an appropriate setting value can be set without a labor task of resetting a time zone by a user.

The first exemplary embodiment has been described using a method by which a new option is generated to set a time zone. However, a method by which a time zone is set from existing options may be employed.

Figure 6:
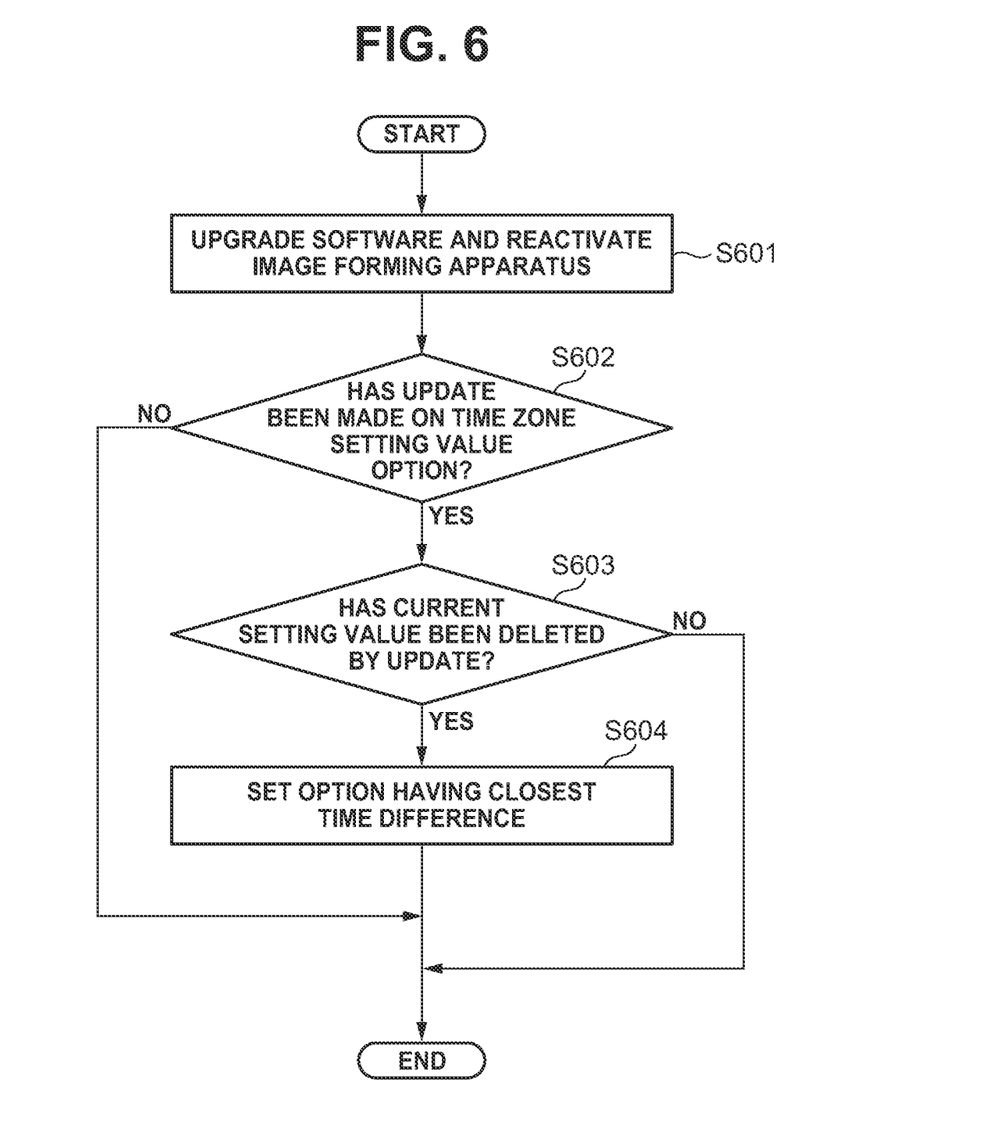
FIG. 6 is a flowchart illustrating an example of correction processing for a time zone setting according to one or more aspects of the present disclosure.

In a second exemplary embodiment, processing by which an option is selected from existing options to perform setting will be described using a flowchart illustrated in FIG. 6. The processing of the flowchart begins when a CPU 101 receives a software upgrade instruction. Hereinafter, redundant descriptions of the first exemplary embodiment are omitted, and the present exemplary embodiment will be described by referring to differences from the first exemplary embodiment.

In steps S601 through S603, the CPU 101 performs processing similar to the processing in steps S401 through S403 according to the first exemplary embodiment.

In step S604, the CPU 101 newly sets an option having the closest time difference from time zone setting value options. That is, an option having a smallest difference in time between before the upgrade and after the upgrade is set.

Figure 7:
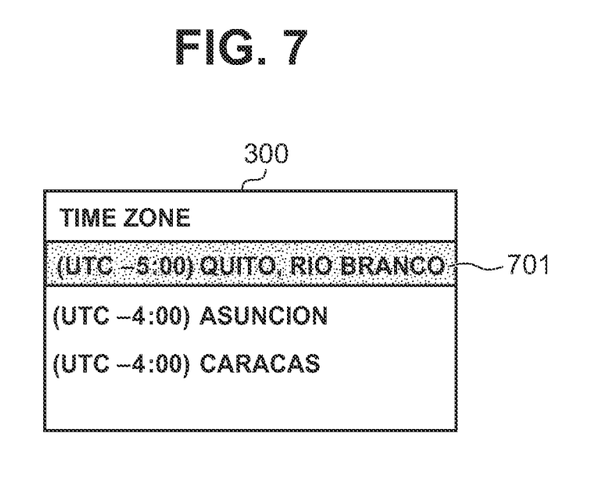
FIG. 7 is a diagram illustrating an example a setting screen after the time zone setting is corrected according to one or more aspects of the present disclosure.

Herein, FIG. 7 is a diagram illustrating an example of a time zone setting screen in a case where a time zone setting is corrected in step S604.

If a time zone setting value that is currently set is deleted by the upgrade, the CPU 101 sets a setting value 701 indicating the same time difference to a time zone.

According to the present exemplary embodiment, therefore, an appropriate setting value can be set without increasing the number of options for setting a time zone.

Each of the first and second exemplary embodiments has been described using a method by which the CPU 101 sets an appropriate setting value. However, another method may be employed. For example, a user may be notified that setting needs to be performed, and the user may be prompted to manually perform setting.

Figure 8:
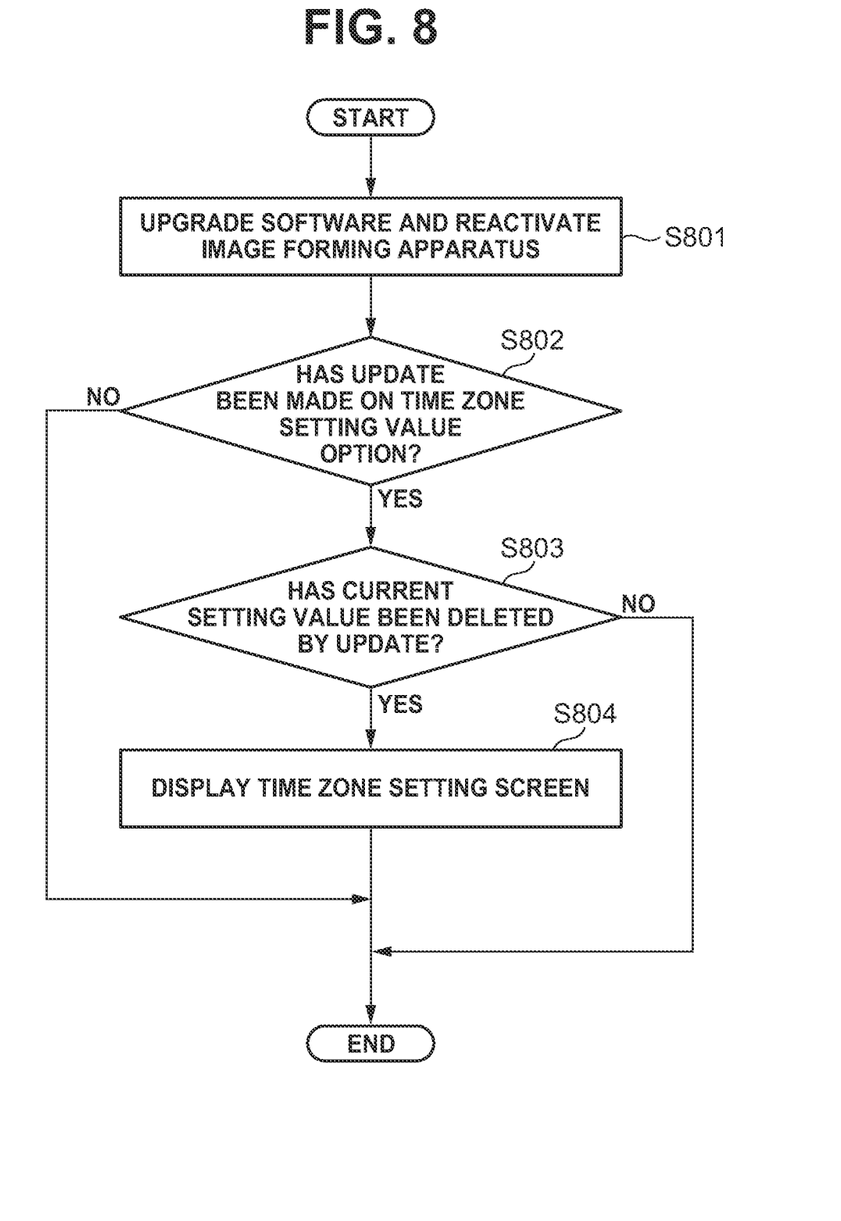
FIG. 8 is a flowchart illustrating an example of correction processing for a time zone setting according to one or more aspects of the present disclosure.

In a third exemplary embodiment, processing for displaying a time zone setting screen to a user after software is upgraded will be described using a flowchart illustrated in FIG. 8. The processing of the flowchart begins when a CPU 101 receives a software upgrade instruction.

In steps S801 through S803, the CPU 101 performs processing similar to the processing in steps S401 through S403 according to the first exemplary embodiment.

In step S804, the CPU 101 displays a time zone setting screen on an operation display unit 105. Accordingly, a user can be informed of the necessity of setting of a time zone.

Figure 9:
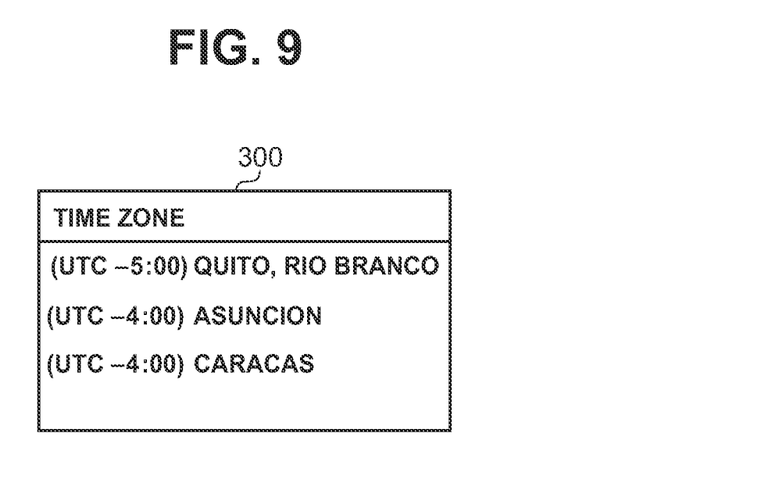
FIG. 9 is a diagram illustrating an example of a setting screen after the time zone setting is corrected according to one or more aspects of the present disclosure.

FIG. 9 is a diagram illustrating an example of a setting screen when a time zone is set.

Since a time zone setting value that is currently set is not present due to an upgrade, the CPU 101 preferentially displays a time zone setting screen on the operation display unit 105 to prompt a user to perform setting. Since the example illustrated in FIG. 9 indicates a state in which a time zone setting is indefinite, none of the values is highlighted.

Herein, the CPU 101 may display a message indicating that a time zone setting value has been deleted by upgrade of software and a time zone needs to be set. Such a message may be displayed on a setting screen.

According to the present exemplary embodiment, a user can be prompted to reset a time zone, and an appropriate setting value can be set even when, for example, an installation location of an image forming apparatus after the upgrade is changed from an installation location before the upgrade.

Other Exemplary Embodiments

Aspects of the present disclosure can be achieved by a process in which a program for performing one or more functions of the above-described exemplary embodiments is supplied to a system or an apparatus via a network or a storage medium, and one or more processors in a computer of the system or the apparatus reads and executes the program. In addition, aspects of the present disclosure can be achieved by a circuit (e.g., application specific integrated circuit (ASIC)) for performing one or more functions.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-175498, filed Oct. 27, 2021, which is hereby incorporated by reference herein in its entirety.

What is claimed is:

1. An information processing apparatus comprising at least one processor and at least a memory coupled to the at least one processor and having instructions stored thereon, and when executed by the at least one processor, acting as:
   a detection unit configured to detect that a setting value related to a time has been deleted; and
   a setting unit configured, in a case where deletion of the setting value related to the time has been detected by the detection unit, to newly generate an option corresponding to the deleted setting value and to set the option as a new setting value related to the time,
   wherein the setting value related to the time includes information about a region corresponding to the time, and
   wherein the setting unit newly generates the option that has a time same as that of the deleted setting value and does not include information about the region corresponding to the time.

2. The information processing apparatus according to claim 1, wherein the detection unit detects deletion of a setting value related to a time due to upgrade of software.

3. The information processing apparatus according to claim 1, wherein the information processing apparatus is an image forming apparatus having a print function.

4. A control method for an information processing apparatus, the method comprising:
   detecting that a setting value related to a time has been deleted; and
   newly generating, in a case where deletion of the setting value related to the time has been detected by the detecting, an option corresponding to the deleted setting value, and setting the option as a new setting value related to the time,
   wherein the setting value related to the time includes information about a region corresponding to the time, and wherein the setting unit newly generates the option that has a time same as that of the deleted setting value and does not include information about the region corresponding to the time.

5. A non-transitory computer readable storage medium storing a program for causing a computer to execute a method comprising: detecting that a setting value related to a time has been deleted; and newly generating, in a case where deletion of the setting value related to the time has been detected by the detecting, an option corresponding to the deleted setting value, and setting the option as a new setting value related to the time, wherein the setting value related to the time includes information about a region corresponding to the time, and wherein the setting unit newly generates the option that has a time same as that of the deleted setting value and does not include information about the region corresponding to the time.

6. The information processing method according to claim 4, wherein the deletion of a setting value related to a time due to upgrade of software is detected.

* * * * *